US011892420B2

(12) United States Patent
Rehnström

(10) Patent No.: US 11,892,420 B2
(45) Date of Patent: Feb. 6, 2024

(54) DEVICE, A METHOD, A SYSTEM, AND A KIT OF PARTS FOR MEASURING AN AMOUNT OF DIRT

(71) Applicant: Rehninvent AB, Råå (SE)

(72) Inventor: Johan Henrik Rehnström, Bristol (GB)

(73) Assignee: REHNINVENT AB, Råå (SE)

( * ) Notice: Subject to any disclaimer, the term of this patent is extended or adjusted under 35 U.S.C. 154(b) by 169 days.

(21) Appl. No.: 17/642,954

(22) PCT Filed: Sep. 4, 2020

(86) PCT No.: PCT/EP2020/074818
§ 371 (c)(1),
(2) Date: Mar. 15, 2022

(87) PCT Pub. No.: WO2021/052784
PCT Pub. Date: Mar. 25, 2021

(65) Prior Publication Data
US 2022/0205941 A1    Jun. 30, 2022

(30) Foreign Application Priority Data
Sep. 20, 2019   (SE) .................................... 1951065-0

(51) Int. Cl.
*G01N 27/04*  (2006.01)
*G01N 1/02*   (2006.01)

(52) U.S. Cl.
CPC ............. *G01N 27/043* (2013.01); *G01N 1/02* (2013.01)

(58) Field of Classification Search
CPC .. G01N 27/043; G01N 1/02; G01N 2001/028; G01N 2015/0096;
(Continued)

(56) References Cited

U.S. PATENT DOCUMENTS

| 2003/0232448 A1 | 12/2003 | Shelley et al. |
| 2006/0028216 A1 | 2/2006 | Murase |

(Continued)

FOREIGN PATENT DOCUMENTS

| JP | 5-232166 A | 9/1993 |
| JP | 10-104287 A | 4/1998 |

(Continued)

OTHER PUBLICATIONS

International Search Report and Written Opinion dated Nov. 12, 2020, received for PCT Application PCT/EP2020/074818, Filed on Sep. 4, 2020, 16 pages.

(Continued)

*Primary Examiner* — Farhana A Hoque
(74) *Attorney, Agent, or Firm* — XSENSUS LLP

(57) ABSTRACT

A device (1), for measuring an amount of dirt (50), comprising: a receiver (2) for receiving a sample collector (40), with a dirt sample attached to the front surface (42); a first (11) and second (12) contact; an electrically conductive surface (14); an aligner (20) for positioning the electrically conductive surface (14) in contact with the back surface (44) of the received sample collector (40); and a resistance meter (30) configured to measure an electrical resistance between the first (11) and second contact (12), wherein, when the first (11) and second contact (12) are placed in contact with the front surface (42) and the electrically conductive surface (14) is placed in contact with the back surface (44), the measured electrical resistance between the first (11) and second contact (12) represents the amount of dirt (50) of the dirt sample between the first (11) and second contact (12).

15 Claims, 6 Drawing Sheets

(58) Field of Classification Search
CPC .......... G01N 15/0606; G01N 15/0656; G01N 27/041; G01N 27/00; G01N 33/00; A47L 13/16; B08B 13/00; G01R 27/00
USPC ........................................................ 324/694
See application file for complete search history.

(56) References Cited

U.S. PATENT DOCUMENTS

2009/0044641 A1* 2/2009 Konduri .............. G01N 1/2273
73/864.33
2013/0180271 A1 7/2013 Kuczynski et al.

FOREIGN PATENT DOCUMENTS

JP 2002-214177 A 7/2002
WO 2019/011530 A1 1/2019

OTHER PUBLICATIONS

Swedish Search Report dated Mar. 10, 2020, received for SE Application 1951065-0, Filed on Sep. 20, 2019, 9 pages.

* cited by examiner

DEVICE, A METHOD, A SYSTEM, AND A KIT OF PARTS FOR MEASURING AN AMOUNT OF DIRT

CROSS-REFERENCE TO RELATED APPLICATIONS

The present application is based on PCT filing PCT/EP2020/074818, filed Sep. 4, 2020, which claims priority to SE 1951065-0, filed Sep. 20, 2019, the entire contents of each are incorporated herein by reference.

TECHNICAL FIELD

The present invention relates, in general, to measuring an amount of dirt.

BACKGROUND

During cleaning of objects in facilities, cleaners commonly assess the cleanliness of various objects, consciously or unconsciously. This may be done in order to determine which objects in the facility are dirtiest and needs most cleaning, if an object that has been cleaned is clean enough or needs more cleaning, if an uncleaned object is clean enough and needs no cleaning etc. Assessing the cleanliness may result in a high quality of the cleaning process. The quality may be high in terms of an overall cleaner facility when more cleaning time is spent on the dirtiest objects and not wasted on already clean object. The quality may also be high in terms of a more cost effective cleaning process when less cleaning time needs to be allocated to a facility when the facility or objects in the facility are cleaned only when needed.

The by far most common method for assessment of cleanliness is ocular observation, i.e. by looking at the objects using the eyes. A method for assessing cleanliness in terms of an amount of organic residues on an object is the ATP method. ATP is a molecule found in biological cells and in the ATP method a sample from the surface of an object is chemically processed to detect the presence of ATP. Another method for assessing cleanliness is UV lighting wherein a surface is illuminated with UV light to induce fluorescence from certain types of dirt, e.g. blood, urine, saliva etc.

Although these assessment methods work there is room for improving how dirt amounts are measured.

SUMMARY

It is an objective of the invention to provide improved means for measuring an amount of dirt. It is a further objective of the invention to provide means for measuring an amount of dirt which are accurate, versatile, fast and inexpensive.

These and other objectives of the invention are at least partly met by the invention as defined in the independent claims. Preferred embodiments are set out in the dependent claims.

According to a first aspect of the invention, there is provided a device for measuring an amount of dirt, the device comprising:

a receiver configured to receive a sample collector, the sample collector having a front surface and a back surface, wherein a dirt sample is attached to the front surface of the sample collector;

a first contact configured to be placed in contact with the front surface of the received sample collector at a first contact point and a second contact configured to be placed in contact with the front surface of the received sample collector at a second contact point, the first and second contact being electrically conductive;

an electrically conductive surface;

an aligner configured to position the electrically conductive surface in contact with the back surface of the received sample collector, wherein, when the electrically conductive surface is positioned by the aligner:

a first part of the electrically conductive surface is placed in contact with the back surface of the sample collector at a point transverse to the first contact point on the front surface; and a second part of the electrically conductive surface is placed in contact with the back surface of the sample collector at a point transverse to the second contact point on the front surface; the device further comprising a resistance meter configured to measure an electrical resistance between the first and the second contact, wherein, when the first and second contact are placed in contact with the front surface and the electrically conductive surface is placed in contact with the back surface, the measured electrical resistance between the first and second contact represents the amount of dirt of the dirt sample, the represented amount of dirt being situated on the front surface of the sample collector between the first and second contact.

According to the inventive concept a dirt sample may be taken from an object, e.g. a table, a floor, or a shelf. This may be done e.g. by swiping a sample collector over the surface of the object with the front surface of the sample collector facing the object. A measurement of the amount of dirt on the sample collector may then be seen as representative of how dirty the surface is. It should herein be understood that in order to achieve an accurate measurement the collection of the sample may be standardized, e.g. the sample collector is swiped a certain distance for each measurement. A new or cleaned sample collector may also be used for each measurement.

It should be understood that the sample collector may be a microfiber cloth. An advantage of configuring the device to receive a microfiber cloth as a sample collector is that it is easy to incorporate the device in a cleaning process. Most cleaners carry microfiber cloths and microfiber cloths used for taking a dirt sample may also be used for continued cleaning after the measurement is done. In the following, the invention will be described predominately in the context of the sample collectors being microfiber cloths. However, it should be understood that other sample collectors may also be used, e.g. stiff sample collectors with microfiber surfaces. It should be understood that the front and back side of the sample collector may refer to opposite sides of the sample collector, e.g. opposite sides of a microfiber cloth.

An advantage of a device according to the first aspect is that it provides accurate measurements of dirt amounts. It is a realization of the invention that dirt on a surface may change the surface resistivity of the surface. For example, a microfiber cloth may use static electricity to gather dirt, and the amount of static electricity may be inversely proportional to the amount of dirt collected. The static electricity may be proportional to the resistivity of the system in question. The surface may conduct an electrical current more readily when it is dirty such that the resistance decreases. The dirt may thus form a conductive path on the surface of a sample collector. By measuring the resistance between two contacts on a surface the surface resistivity may be evaluated based on the resistance and the contact dimensions and spacing, as readily understood by the skilled person. Thus, according to the inventive concept, a resistance measurement over the surface of the sample collector can be used to measure the amount of dirt situated on the sample collector in between the first and second contact. This value may then be related to how dirty the object was when the sample was taken. It is a further realization of the invention that a resistance measurement for dirt evaluation may be affected by other conductive paths related to the sample collector, e.g. through the sample collector or on other surfaces of the sample collector than the front surface.

The inventor has found that positioning an electrically conductive surface on the back surface of the sample collector may improve the accuracy. The resistance reading may become more stable and/or more reproducible when an electrically conductive surface is positioned on the back surface. During a resistance measurement without the electrically conductive surface a current may run from one contact along the front surface of the sample collector to the other contact, this current path may be used to measure the amount of dirt. However, it is possible that current also runs through one of the contacts, through the sample collector, along the back side if the sample collector, and through the sample collector again to the other contact. It is possible that short-circuiting this current path using the electrically conductive surface may improve the measurement. It is also possible that the electrically conductive surface redistributes charges on the back surface. It is also possible that the electrically conductive surface lowers the total resistance between the first and second contact, thereby shifting the resistance into a range where the resistance meter is more accurate.

It should be understood that a point on the back surface of the sample collector which is transverse to the first contact point on the front surface may be defined as a point on the back surface indicated by a vector which starts in the first contact point, runs through the sample collector in a direction normal to the front surface at the first contact point, and ends on the back surface. It should be understood that a point on the back surface of the sample collector which is transverse to the second contact point on the front surface may be defined analogously.

By ensuring that at least one contact point between a contact and the sample collector has a corresponding contact point on the transverse side of the sample collector a short current path between the contact and the electrically conductive surface may be ensured. This may reduce the resistance for a current running through the sample which may improve the accuracy of the measurement. It may also ensure that the electrically conductive surface at least partially overlaps the first and second contact on the transverse side of the sample collector. This may ensure a corresponding low resistance current path on the back side of the sample collector, wherein the current path may or may not be in contact with the back surface of the sample collector. Such a current path may help to short-circuit a back side current path and/or redistribute charges on the back surface.

Another advantage of a device according to the first aspect is that it provides versatile measurements of dirt amounts. The resistance may be affected both by organic and inorganic dirt on the sample collector. Thus, the device may be used for measuring both organic and inorganic dirt. Furthermore, the measurement may be quantitative in contrast to e.g. ocular inspection or UV-light.

Another advantage of a device according to the first aspect is that it provides fast measurements of dirt amounts. A resistance measure may be faster than e.g. chemical methods which rely on reactions having time to proceed. The device may also be simple enough to be used by unskilled persons. Samples may not need to be sent to a distant lab or measurement facility which may save time.

Another advantage of a device according to the first aspect is that it provides inexpensive measurements of dirt amounts. The device may be made of standard electrical components, making it cheap to manufacture.

It should be understood that the receiver may be configured such that the sample collector is received on top of the first and second contact, the receiver may e.g. comprise the first and second contact together with an area between the first and second contact. The receiver may also be configured such that the sample collector is received on top of the electrically conductive surface, the receiver may e.g. be the electrically conductive surface.

It should be understood that the dirt sample may be attached to the front surface of the sample collector electrostatically, e.g. by static electricity.

It should be understood that the first contact may have a minimum contact area to the front surface, e.g. a minimum contact area of 0.5 cm$^2$, 1 cm$^2$, or 5 cm$^2$. The second contact may also have a minimum contact area to the front surface, e.g. a minimum contact area of 0.5 cm$^2$, 1 cm$^2$, or 5 cm$^2$. The first and second contact may have a minimum separation distance, the minimum separation distance being e.g. 0.5 cm, 1 cm or 5 cm. The first and second contact may be parallel to each other. The first and second contact may have the same length in a direction orthogonal to the separation direction between the contacts. The length may have a minimum value of e.g. 1 cm, 2 cm or 5 cm. A measurement area between the contacts, defined e.g. by the length of two parallel contacts times the separation distance between the contacts may have a minimum area of e.g. 0.5 cm$^2$, 5 cm$^2$, or 20 cm$^2$. Such contact measures may be particularly suitable for resistance measurements on dirt.

It should be understood that the shape of the first and second contacts may conform to the shape of the electrically conductive surface. The electrically conductive surface may e.g. form a convex surface, e.g. spherically convex, interfacing the back side of a microfiber cloth hanging over the convex surface. The first and second contact may then have concave shapes conforming to the convex surface when they interface the front side of the hanging microfiber cloth.

It should be understood that the aligner may be a mechanical arrangement of the device which moves the electrically conductive surface into contact with the back surface of the received sample collector while ensuring that the electrically conductive surface is positioned with respect to the first and second contact. It should also be understood that the aligner may be a mechanical arrangement of the device which moves the first and second contact into electrical contact with the front surface of the received sample collector while ensuring that the first and second contact are correctly positioned with respect to the electrically conductive surface.

It should also be understood that the aligner may be a guide for the eye or a guide for the touch of the user which ensures a correct positioning of the first and second contact, the sample collector and the electrically conductive surface in relation to each other. For example, the first and second contact may be positioned on a plate, the sample collector may be placed on the plate over the first and second contact. The holder may then comprise one or more guides in the form of lines or ledges corresponding one or more edges of the electrically conductive surface or a carrier of the electrically conductive surface. The entire perimeter of the electrically conductive surface or carrier may also be outlined. Thus, when the electrically conductive surface is placed on top of the sample holder in accordance with the guide or guides the electrically conductive surface may be positioned correctly in relation to the underlying contacts even if these may not be visible.

It should be understood that the resistance meter may be e.g. an Ohm meter. It should also be understood that the resistance meter together with the first and second contact may form a resistivity meter. The surface resistivity may e.g. be the resistance times the length of the contacts divided by the separation distance between the contacts.

According to the inventive concept the aligner may comprise:
  a front portion, the first and second contact being attached to the front portion;
  a back portion, the electrically conductive surface being attached to the back portion;
  a hinge which mechanically connects the front portion with the back portion, wherein the hinge allows rotational movement of the front portion in relation to the back portion, the hinge having
    a rotationally open position in which the receiver is free to receive the sample collector, and
    a rotationally closed position in which the electrically conductive surface is in contact with the back surface of the received sample collector;
  wherein the front portion, the back portion and the hinge are configured to position the electrically conductive surface in contact with the back surface of the received sample collector when the hinge is in the rotationally closed position.

A device with such an aligner is user-friendly. The device may be constructed as one single unit. Aligning the electrically conductive surface with the first and second contact may be done with minimal thought effort. Aligning the electrically conductive surface with the first and second contact may be done with a single hand movement. A device with such an aligner is accurate. Restricting the movement of the electrically conductive surface to a single rotational movement may leave little room for error.

It should be understood that at least part of the front portion, the back portion or the hinge may be electrically insulative. This may prevent current paths between the contacts that bypasses the sample collector.

The hinge and the electrically conductive surface may be positioned on opposite sides of a plane comprising the first and second contact. Thus, a pivot point of the rotational movement and the electrically conductive surface may be positioned on opposite sides of a plane comprising the first and second contact. This may be advantageous as it may facilitate the electrically conductive surface moving into contact with the back surface of the received sample collector without moving the received sample collector relative to the first and second contacts.

According to the inventive concept the electrically conductive surface and the aligner may be configured such that when the electrically conductive surface is positioned by the aligner an sample-collector/electrically-conductive-surface interface (SC/ECS interface) covers:
  a transverse representation of a sample-collector/first-contact interface (SC/1C interface); and
  a transverse representation of a sample-collector/second-contact interface (SC/2C interface);
  wherein:

the SC/ECS interface represents an interface between the back surface of the received sample collector in contact with the electrically conductive surface;

the SC/1C interface represents an interface between the front surface of the received sample collector in contact with the first contact, the transverse representation of the SC/1C interface being an area on the back surface defined by a transverse translation of the SC/1C interface from the front surface to the back surface;

the SC/2C interface represents an interface between the front surface of the received sample collector in contact with the second contact, the transverse representation of the SC/2C interface being an area on the back surface defined by a transverse translation of the SC/2C interface from the front surface to the back surface.

Experiments have indicated that a device with such an aligner is accurate. It may be that by ensuring that the SC/1C interface and the SC/2C interface on the front surface have corresponding interfaces between the sample collector and the electrically conductive surface on the back surface, a short current path through the sample collector can be ensured for all points where the contacts touch the sample collector. This may reduce the resistance for a current running through the sample which may improve the accuracy of the measurement. It may also ensure that the electrically conductive surface fully overlaps the first and second contact on the transverse side of the sample collector. This may ensure a corresponding low resistance current path on the back side of the sample collector, wherein the current path may or may not be in contact with the back surface of the sample collector at every point in between the first and second contact. Such a current path may help to short-circuit a back side current path and/or redistribute charges on the back surface.

It should be understood that a transverse translation of the SC/1C interface from the front surface to the back surface may be defined as each point of the SC/1C interface on the front surface being translated from the front surface along a normal to the front surface in said point, through the sample collector, to a corresponding point on the back surface, wherein all the corresponding points on the back surface make up the transverse representation of the SC/1C interface. The transverse translation of the SC/2C interface from the front surface to the back surface may be defined analogously.

The electrically conductive surface and the aligner may further be configured such that when the electrically conductive surface is positioned by the aligner the sample-collector/electrically-conductive-surface interface (SC/ECS interface) additionally covers:
  a transverse representation of a sample measurement area;
  wherein the sample measurement area is an area on the front surface of the sample collector which extends between the first and the second contact, the transverse representation of the sample measurement area being an area on the back surface defined by a transverse translation of the sample measurement area from the front surface to the back surface.

Experiments have indicated that a device with such an aligner is accurate. It may be that making the SC/ECS interface additionally cover the transverse representation of the sample measurement area ensures that charges at any point on the back surface area which lies between the first and second contact may be effectively redistributed to a point on top of a contact. The charge may subsequently move a short distance through the sample collector to reach the contact.

It should be understood that the transverse representation of the sample measurement area may be defined as each point of the sample measurement area being translated along a normal to the front surface at said point, through the sample collector, to a corresponding point on the back surface, wherein all the corresponding points on the back surface make up the transverse representation of the sample measurement area.

According to the inventive concept the device may further comprise a contact pressure controller configured to set a pressure exerted on the sample collector by the electrically conductive surface and at least one of the first and the second contact when the first and second contact are placed in contact with the front surface and the electrically conductive surface is placed in contact with the back surface.

A device comprising a contact pressure controller is accurate. The pressure exerted on the sample collector by the electrically conductive surface and a contact may affect the resistance of a current path from the contact, through the sample collector, to the electrically conductive surface. For example, when the sample collector is sandwiched between the electrically conductive surface and a contact the pressure exerted may affect how much the sample collector is compressed which in turn affects the resistance. Thus, setting the pressure to be the same from one measurement to another may improve the reproducibility of the measurements.

It should be understood that the contact pressure controller may be a spacer that sets a minimum distance between the contact and the electrically conductive surface. The spacer may e.g. be a spacer on the front portion or the back portion of the aligner that restricts the rotational movement. It should also be understood that the pressure controller may be an active device which measures and sets the pressure.

It should be understood that the electrically conductive surface may be a floating conductor. Thus, the electrical potential of the electrically conductive surface may be electrically floating such that it is electrically disconnected from ground and electrically disconnected from a power supply. This may ensure that all current paths from the first contact leads to the second contact and vice versa. This may ensure accurate measurements.

It should be understood that a surface of the device, the surface reaching from the first contact to the second contact, may be electrically floating. Thus, the surface reaching from the first contact to the second contact may be electrically disconnected from ground and electrically disconnected from a power supply. This may ensure that all current paths from the first contact leads to the second contact and vice versa. This may ensure accurate measurements.

It should be understood that the sample collector may be a microfiber cloth. Thus, according to one aspect of the invention, there is provided a device for measuring an amount of dirt on a microfiber cloth, the device comprising:

a receiver configured to receive a sample collector, the sample collector being a microfiber cloth, the sample collector having a front surface and a back surface, wherein a dirt sample is attached to the front surface of the sample collector;

a first contact configured to be placed in contact with the front surface of the received sample collector at a first contact point and a second contact configured to be placed in contact with the front surface of the received sample collector at a second contact point, the first and second contact being electrically conductive;

an electrically conductive surface;

an aligner configured to position the electrically conductive surface in contact with the back surface of the received sample collector, wherein, when the electrically conductive surface is positioned by the aligner:

a first part of the electrically conductive surface is placed in contact with the back surface of the sample collector at a point transverse to the first contact point on the front surface; and a second part of the electrically conductive surface is placed in contact with the back surface of the sample collector at a point transverse to the second contact point on the front surface; the device further comprising a resistance meter configured to measure an electrical resistance between the first and the second contact, wherein, when the first and second contact are placed in contact with the front surface and the electrically conductive surface is placed in contact with the back surface, the measured electrical resistance between the first and second contact represents the amount of dirt of the dirt sample, the represented amount of dirt being situated on the front surface of the sample collector between the first and second contact.

According to a second aspect of the invention, there is provided a system for measuring an amount of dirt, the system comprising:

a device according to the first aspect of the invention;

a memory configured to store a relation between measured electrical resistance and amount of dirt situated on the front surface of the sample collector between the first and second contact;

a processor configured to:

receive the measured electrical resistance from the resistance meter;

receive the relation from the memory; and to calculate the amount of dirt using the measured electrical resistance and the relation.

Effects and features of this second aspect are generally analogous to those described above in connection with the first aspect. Embodiments mentioned in relation to the first aspect are generally compatible with the second aspect.

A further advantage is that the system is easy to use. While the resistance may be inversely proportional to the amount of dirt the system may calculate a value that is proportional to the amount of dirt.

It should be understood that the memory and/or processor may be situated in the device or in another device, e.g. in a cell phone or a server.

It should be understood that the relation may be a set of calibration values measured for different amounts of dirt. It should also be understood that the relation may be an empirical or theoretical model of how the resistance varies with the amount of dirt.

According to a third aspect of the invention, there is provided a method for measuring an amount of dirt, the method comprising:

receiving a sample collector, the sample collector having a front surface and a back surface, wherein a dirt sample is attached to the front surface of the sample collector;

placing a first contact in contact with the front surface of the received sample collector at a first contact point and placing a second contact in contact with the front surface of the received sample collector at a second contact point;

positioning an electrically conductive surface in contact with the back surface of the received sample collector, wherein, when the electrically conductive surface is positioned:

a first part of the electrically conductive surface is placed in contact with the back surface of the sample collector at a point transverse to the first contact point on the front surface; and a second part of the electrically conductive surface is placed in contact with the back surface of the sample collector at a point transverse to the second contact point on the front surface; the method further comprising measuring an electrical resistance between the first and the second contact, wherein, when the first and second contact are placed in contact with the front surface and the electrically conductive surface is positioned in contact with the back surface, the measured electrical resistance between the first and second contact represents the amount of dirt of the dirt sample, the represented amount of dirt being situated on the front surface of the sample collector between the first and second contact.

Effects and features of this third aspect are generally analogous to those described above in connection with the first aspect. Embodiments mentioned in relation to the first aspect are generally compatible with the second aspect.

According to the method of the third aspect of the invention the electrically conductive surface may be positioned such that an sample-collector/electrically-conductive-surface interface (SC/ECS interface) covers:

a transverse representation of a sample-collector/first-contact interface (SC/1C interface); and a transverse representation of a sample-collector/second-contact interface (SC/2C interface);

wherein:

the SC/ECS interface represents an interface between the back surface of the received sample collector in contact with the electrically conductive surface;

the SC/1C interface represents an interface between the front surface of the received sample collector in contact with the first contact, the transverse representation of the SC/1C interface being an area on the back surface defined by a transverse translation of the SC/1C interface from the front surface to the back surface;

the SC/2C interface represents an interface between the front surface of the received sample collector in contact with the second contact, the transverse representation of the SC/2C interface being an area on the back surface defined by a transverse translation of the SC/2C interface from the front surface to the back surface.

According to the method of the third aspect of the invention the electrically conductive surface may be positioned such that the sample-collector/electrically-conductive-surface interface (SC/ECS interface) additionally covers:

a transverse representation of a sample measurement area;

wherein the sample measurement area is an area on the front surface of the sample collector which extends between the first and the second contact, the transverse representation of the sample measurement area being an area on the back surface defined by a transverse translation of the sample measurement area from the front surface to the back surface.

The method of the third aspect of the invention may further comprise:

controlling a contact pressure to set a pressure exerted on the sample collector by the electrically conductive surface and at least one of the first and the second contact when the first and second contact are placed in contact with the front surface and the electrically conductive surface is placed in contact with the back surface.

The method of the third aspect of the invention may further comprise:

receiving a measured electrical resistance from the resistance meter;

receiving a relation between measured electrical resistance and amount of dirt situated on the front surface of the sample collector between the first and second contact;

calculating the amount of dirt using the measured electrical resistance and the relation.

As previously mentioned the sample collector may be a microfiber cloth. Thus, according to an aspect of the invention, there is provided a method for measuring an amount of dirt on a microfiber cloth, the method comprising:

receiving a sample collector, the sample collector being a microfiber cloth, the sample collector having a front surface and a back surface, wherein a dirt sample is attached to the front surface of the sample collector;

placing a first contact in contact with the front surface of the received sample collector at a first contact point and placing a second contact in contact with the front surface of the received sample collector at a second contact point;

positioning an electrically conductive surface in contact with the back surface of the received sample collector, wherein, when the electrically conductive surface is positioned:

a first part of the electrically conductive surface is placed in contact with the back surface of the sample collector at a point transverse to the first contact point on the front surface; and a second part of the electrically conductive surface is placed in contact with the back surface of the sample collector at a point transverse to the second contact point on the front surface; the method further comprising measuring an electrical resistance between the first and the second contact, wherein, when the first and second contact are placed in contact with the front surface and the electrically conductive surface is positioned in contact with the back surface, the measured electrical resistance between the first and second contact represents the amount of dirt of the dirt sample, the represented amount of dirt being situated on the front surface of the sample collector between the first and second contact.

According to a fourth aspect of the invention, there is provided a kit of parts comprising:

a sample collector comprising a front surface and a back surface, the sample collector being configured to collect a dirt sample from an object when the object is wiped with the front surface of the sample collector, the sample collector having one or more electrical resistance properties; and the system according to the second aspect of the invention, wherein the relation stored in the memory of the system, that is a relation between measured electrical resistance and amount of dirt situated on the front surface of the sample collector between the first and second contact, includes at least one electrical resistance property of the sample collector.

Effects and features of this fourth aspect are generally analogous to those described above in connection with the first, second and third aspects. Embodiments mentioned in relation to the first aspect are generally compatible with the first, second and third aspects.

The kit of part provides accurate measurements of the amount of dirt. Different types of sample collectors, e.g.

microfiber cloths made by different manufacturers, may have different resistance properties. Thus, a resistance measurement on one sample collector may give one result while a resistance measurement on another sample collector may give another result even if both sample collectors contain the same amount of dirt. Using a sample collector which is matched to the relation stored in the memory may ensure a correct measurement of the amount of dirt.

It should be understood that resistance properties may be e.g. a calibration set of data relating the resistance expected from a measurement on the sample collector at two or more levels of dirtiness. The calibration set of data may be acquired by calibration measurements on the sample collector or an equivalent sample collector at two or more levels of dirtiness. The calibration set of data may be acquired with the device used for the measurement or with an equivalent device. A measured resistance may then be compared to the two or more data points from the calibration set of data and the amount of dirt represented by the measured resistance may be calculated e.g. by interpolation or extrapolation from the two or more data points. It should be understood that the calibration set of data may not necessarily be measured. It may e.g. be calculated ab initio or calculated from another calibration set of data. For example, a calibration set of data for a microfiber cloth of a certain thickness can be used to calculate a calibration set of data for another microfiber cloth made of the same material but being e.g. twice as thick.

It should also be understood that resistance properties may be measured or estimated values of e.g. a surface resistivity or a volume resistivity of a clean sample collector.

It should be understood that the inventive concept also covers a kit of parts comprising:
  a sample collector comprising a front surface and a back surface, the sample collector being configured to collect a dirt sample from an object when the object is wiped with the front surface of the sample collector, the sample collector having one or more electrical resistance properties; and
  a device according to the first aspect of the invention.

According to the inventive concept the sample collector of the kit of parts may be a microfiber cloth.

Such a kit of parts may provide accurate measurements. Microfiber cloths may utilise static electricity to gather dirt, the amount of static electricity may be inversely proportional to the amount of dirt collected, the static electricity may be proportional to the measured resistance.

Such a kit of parts is also inexpensive. Microfiber cloths may be cheap to produce. They may also be carried and used by most professional cleaners.

According to the inventive concept the microfiber cloth weight per square meter may be below a threshold, the threshold being 600 grams per square meter.

A microfiber cloth with a low weight per square meter may ensure that there is little microfiber material between the first contact and the electrically conductive surface. This may result in a low resistance for a current path through the microfiber cloth which in turn may improve the accuracy of the measurement.

It should be understood that other thresholds may also be used, e.g. 400 grams per square meter, or 250 grams per square meter.

The kit of parts may further comprise a block, wherein the block is configured to receive the microfiber cloth on a flat surface such that when the flat surface of the block is wiped over a flat surface of the object the microfiber cloth is pressed between the flat surface of the block and the flat surface of the object.

This may ensure that the dirt sample is homogeneously distributed over the microfiber cloth. This may improve the accuracy and reproducibility of the measurements.

BRIEF DESCRIPTION OF THE DRAWINGS

The above, as well as additional objects, features and advantages of the present inventive concept, will be better understood through the following illustrative and non-limiting detailed description, with reference to the appended drawings. In the drawings like reference numerals will be used for like elements unless stated otherwise.

DETAILED DESCRIPTION

In cooperation with attached drawings, the technical contents and detailed description of the present invention are described thereinafter according to a preferable embodiment, being not used to limit the claimed scope. This invention may be embodied in many different forms and should not be construed as limited to the embodiments set forth herein; rather, these embodiments are provided for thoroughness and completeness, and fully convey the scope of the invention to the skilled person.

Figure 1:
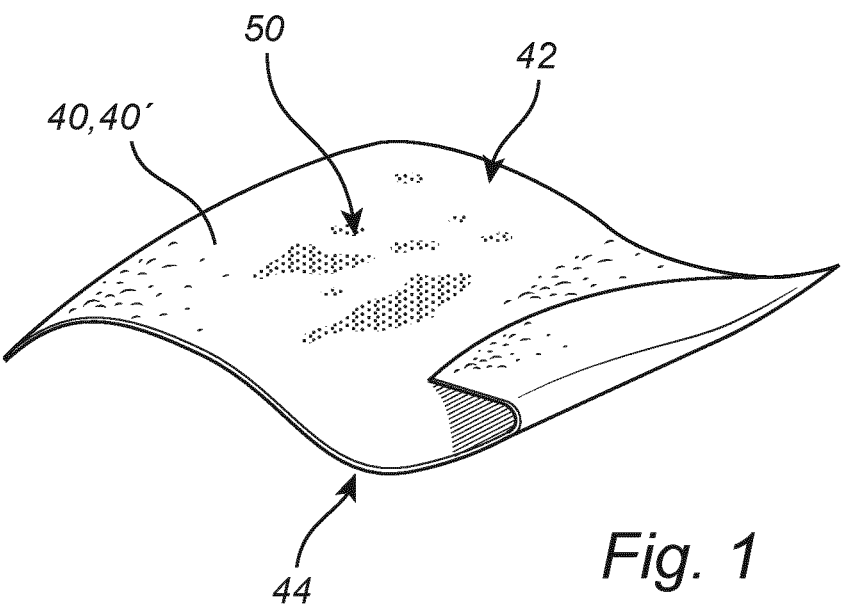
FIG. 1 illustrates a sample collector

FIG. 1 illustrates a sample collector 40 in the form of a microfiber cloth 40'. The microfiber cloth 40' has a front surface 42 and a back surface 44. Dirt 50 is collected on the front surface of the microfiber cloth 40'.

Figure 2:
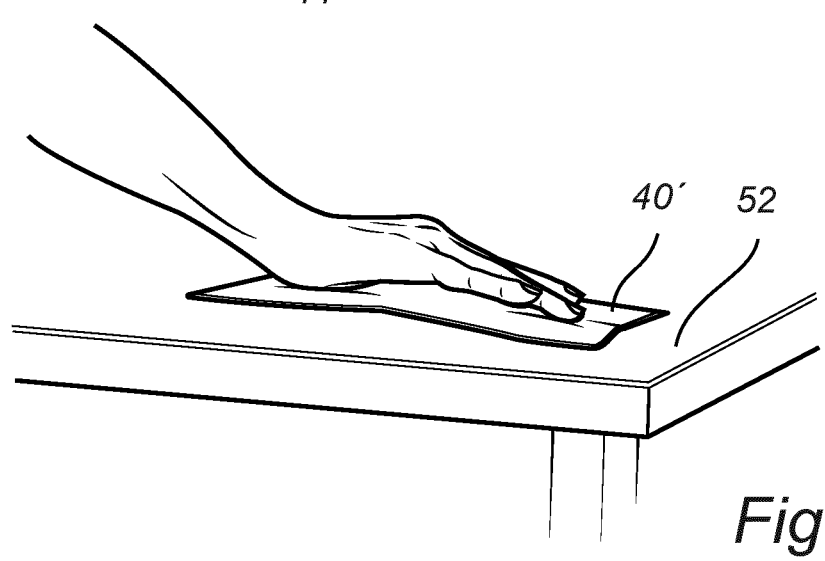
FIG. 2 illustrates a microfiber cloth
Figure 3:
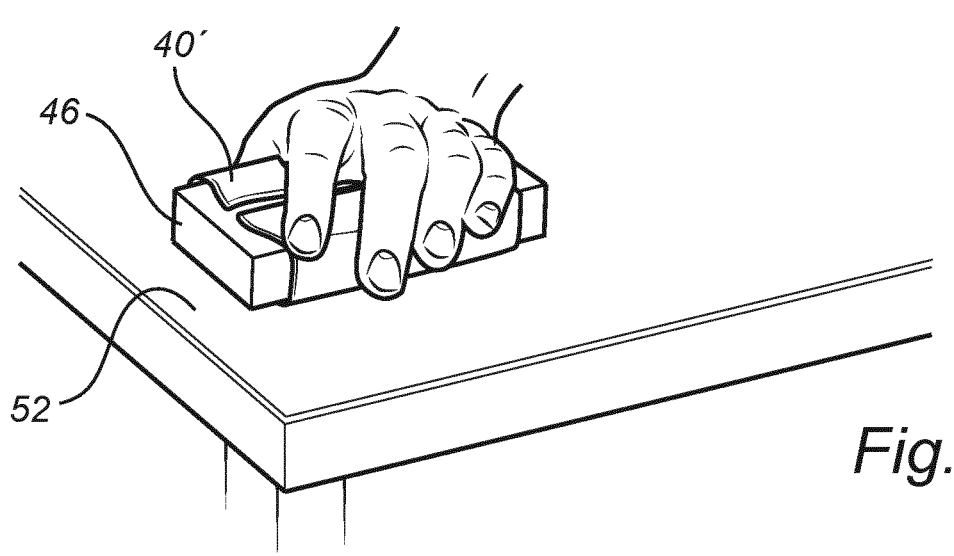
FIG. 3 illustrates a microfiber cloth and a block

FIGS. 2 and 3 illustrate a microfiber cloth 40' being wiped over a surface of an object 52, the object in the illustrations being a table, in order to collect a dirt sample. During the wiping the front surface 42 of the microfiber cloth 40' faces the the object surface to be assessed.

In FIG. 3 a block 46 is being used when the dirt sample is collected. In the illustration the block 46 is herein a cuboid and the microfiber cloth 40' is wrapped around said cuboid.

Figure 4:
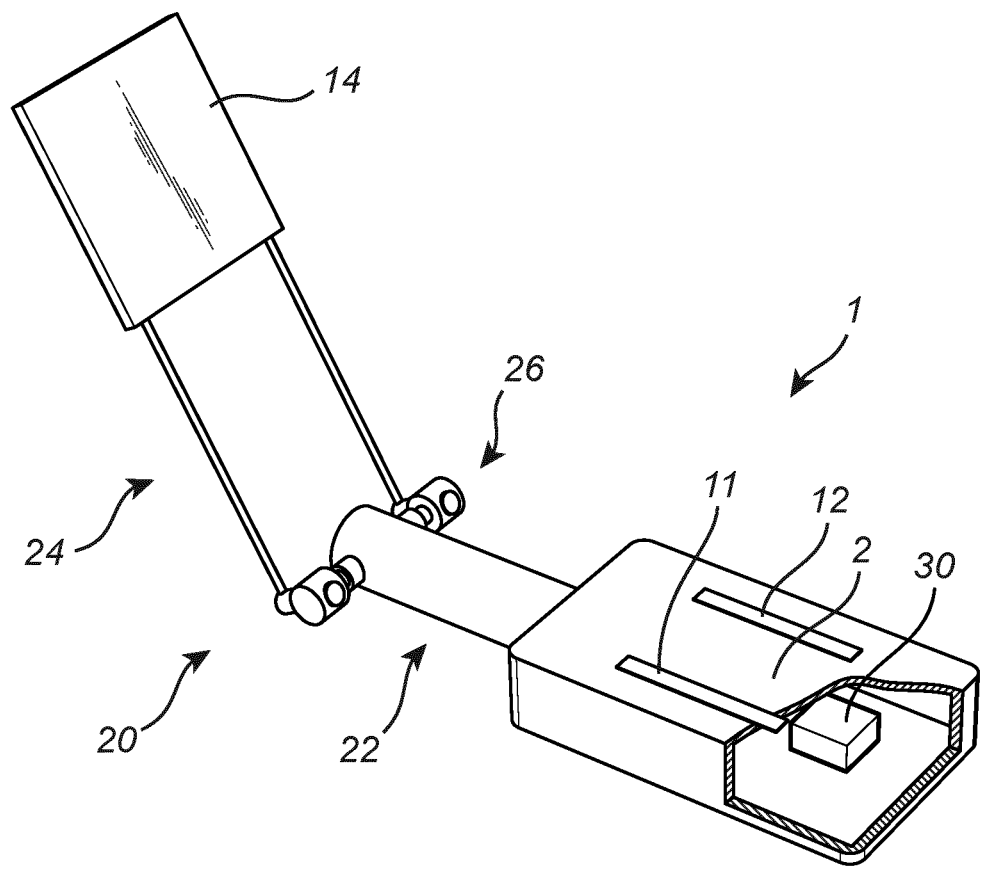
FIG. 4 is a perspective views of a device
Figure 5:
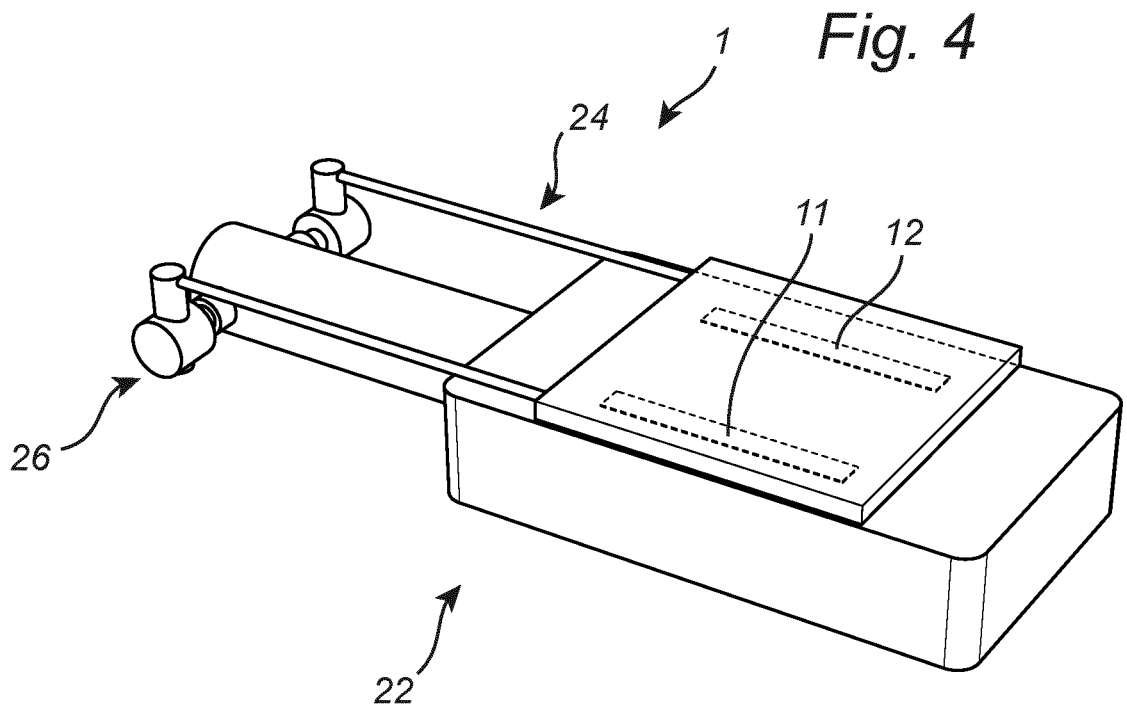
FIG. 5 is a perspective views of a device

FIGS. 4 and 5 are perspective views of a device 1 for measuring an amount of dirt 50. The illustrated device 1 comprises a first contact 11, a second contact 12 and an electrically conductive surface 14. The illustrated device has a flat electrically conductive surface 14. The illustrated device 1 further comprises an aligner 20 which has a front portion 22, a back portion 24, and a hinge 26. In the illustrated device 1 the front portion 22 holds electronic components, such as the resistance meter 30. The resistance meter 30 is electrically connected to the first 11 and second 12 contact such that it can measure the electrical resistance between said contacts. In the illustrated device 1 the back portion 24 comprises two electrically insulating arms that connects the electrically conductive surface 14 to the hinge 26.

The illustrated device 1 has a receiver 2 for receiving a microfiber cloth 40'. The receiver 2 is herein a flat area on the front portion 22 wherein the flat area comprises the first 11 and second 12 contact. The first 11 and second 12 contact may protrude slightly from the flat area. However, in some embodiments the contacts may not protrude.

FIG. 4 illustrates the device when the hinge 26 of the aligner 20 is in a rotationally open position while FIG. 5 illustrates the device when the hinge 26 of the aligner 20 is in a rotationally closed position. In the rotationally open position the receiver 2 is free to receive the microfiber cloth 40'. The microfiber cloth 40' may herein be received when it is placed on the receiver 2, covering both the first 11 and second 12 contact, with the front surface 42 of the microfiber cloth 40' facing the first 11 and second 12 contact. When the hinge 26 is in the rotationally closed position the electrically conductive surface 14 is moved in close proximity to the first 11 and second 12 contact.

Figure 6:
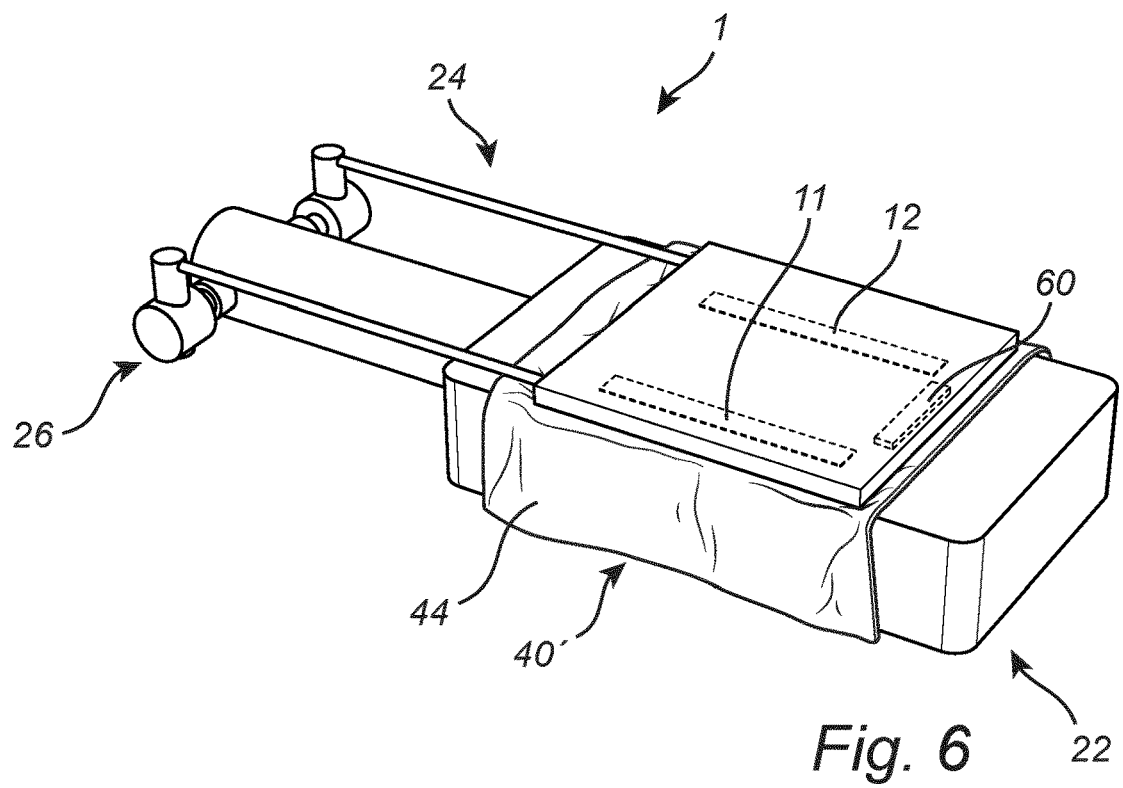
FIG. 6 is a perspective views of a device with a received microfiber cloth

FIG. 6 illustrates a device 1 which has received the microfiber cloth 40' and wherein the electrically conductive surface 14 has been aligned with the first 11 and second 12 contact by placing the hinge 26 in the rotationally closed position. In this position the microfiber cloth 40' is sandwiched between the receiver 2 and the electrically conductive surface 14. In the illustration the first 11 and second 12 contacts are fully in contact with the front surface 42 of the microfiber cloth 40'. The part of the microfiber cloth front surface 42 that lies between the first 11 and second 12 contact, i.e. an area having a width corresponding to the separation of the contacts and a length corresponding to the length of the contacts, defines the measurement area. Dirt 50 on the measurement area may affect the measurement. The measurement may thus represent the amount of dirt 50 in this measurement area. The interface between the first contact 11 and the microfiber cloth 40', the interface between the second contact 12 and the microfiber cloth 40', and the measurement area represents a surface of interest for a surface resistivity measurement. If this surface of interest is translated along a normal to the microfiber cloth 40', the translation being from the front surface to the back surface, a transverse representation of the surface of interest is formed. Charges or currents on the back surface 44 within the transverse representation of the surface of interest may affect the measurement. In the illustration the electrically conductive surface 14 covers this transverse representation of the surface of interest by forming an interface to the microfiber cloth back surface 44 within this entire area, i.e. touching the microfiber cloth back surface 44 within this entire area.

Figure 7:
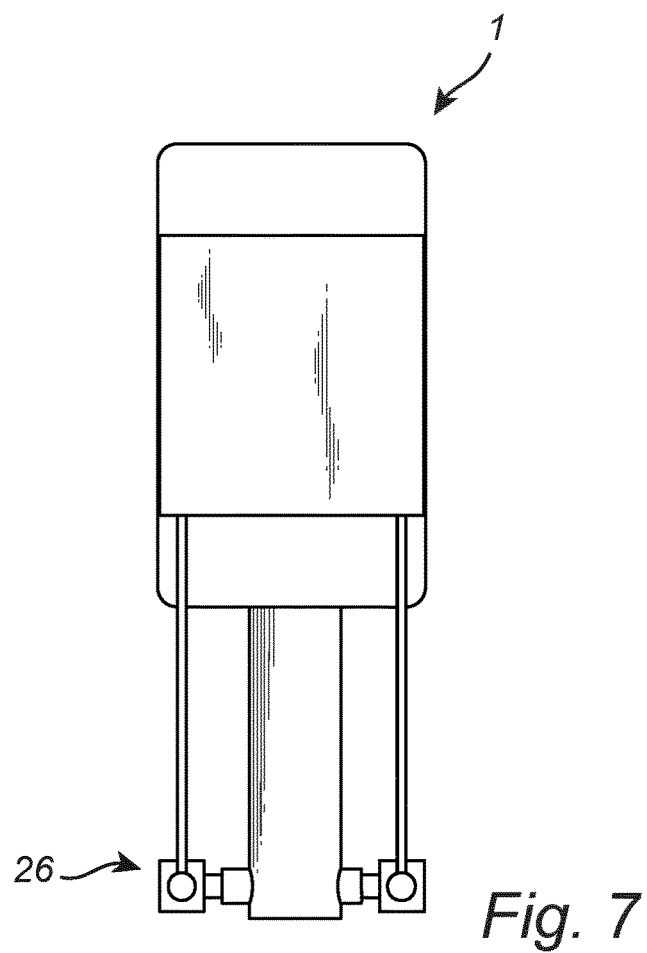
FIG. 7 is a rear view of a device
Figure 8:
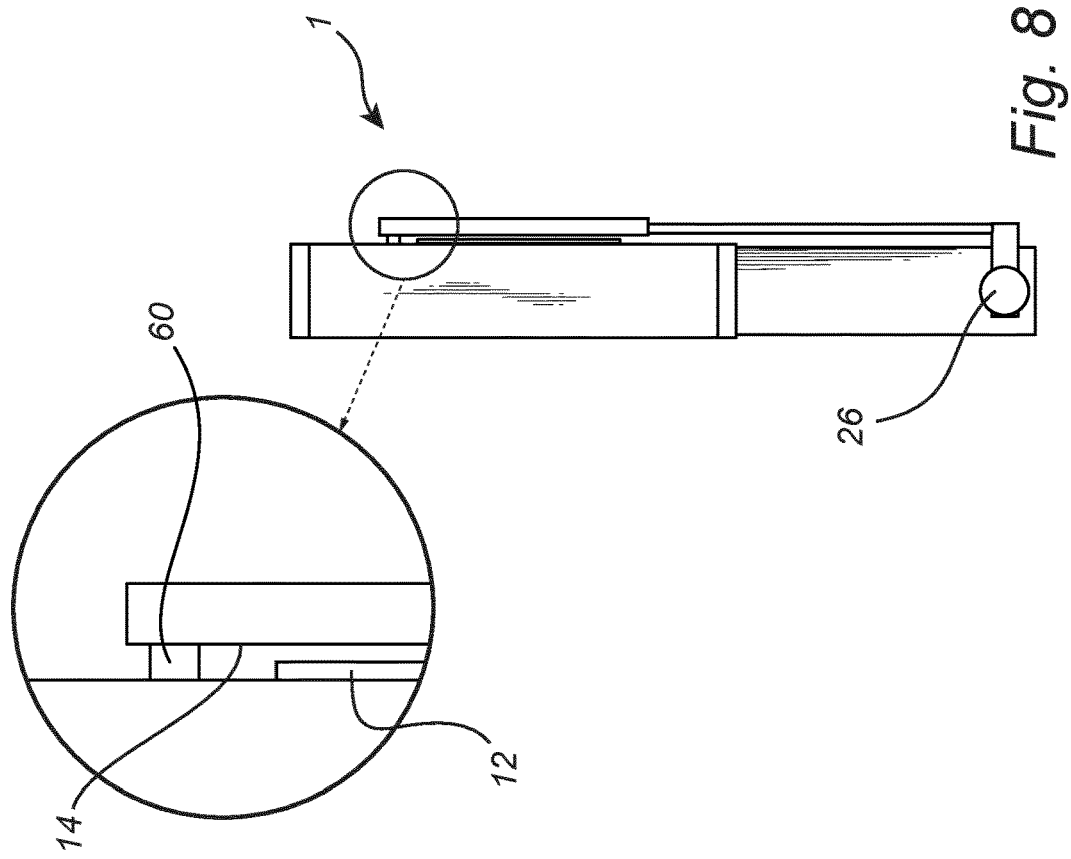
FIG. 8 is a side view of a device

FIG. 7 is a rear view of a device 1 while FIG. 8 is a side view of a device 1. The inset of FIG. 8 illustrates a close-up view of the electrically conductive surface 14 in relation to the second contact 12. In some of the above figures, e.g. FIGS. 6 and 8 the device 1 comprises a contact pressure controller 60 in the form of a spacer that sets a minimum distance between the contacts and the electrically conductive surface 14. This minimum distance may be smaller than the thickness of the microfiber cloth 40' used such that the microfiber cloth 40' is compressed to a predefined thickness. However, it should be understood that the device may function also without a contact pressure controller 60.

Figure 9:
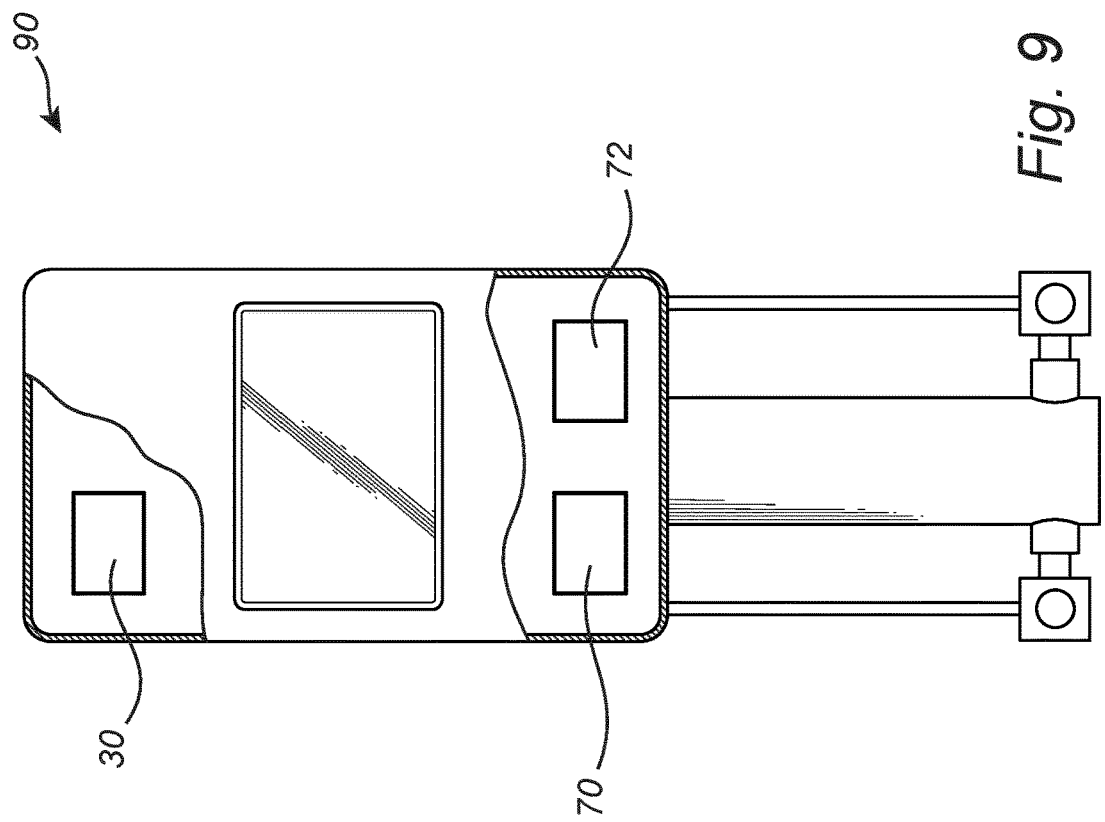
FIG. 9 illustrates a system

FIG. 9 illustrates a system 90 in the form of a device 1 with a memory 70 and a processor 72. The processor may receive a measured electrical resistance from the resistance meter and receive a relation from the memory, wherein the relation defines how the measured electrical resistance depends on the amount of dirt situated on the front surface of the sample collector between the first and second contact. The processor may subsequently calculate the amount of dirt using the measured electrical resistance and the relation.

Figure 10:
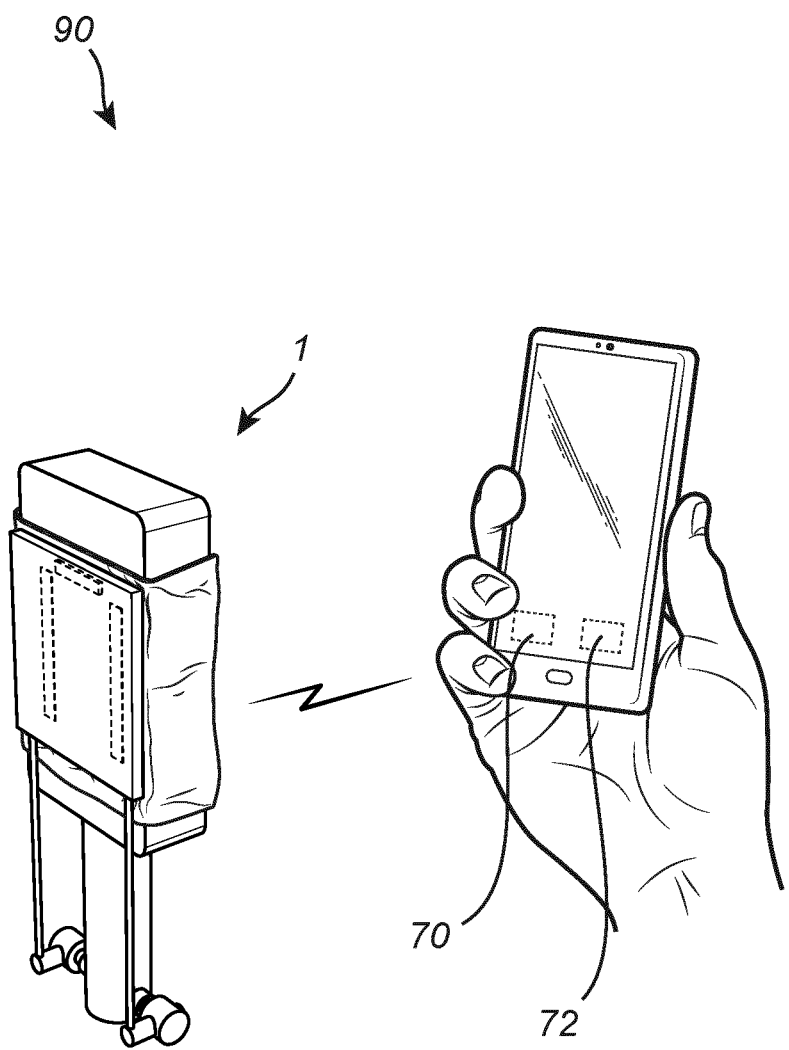
FIG. 10 illustrates a system

FIG. 10 illustrates a system 90 comprising a device 1, a memory 70 and a processor 72. The memory 70 and processor 72 are herein situated in an external device, e.g. a server or a mobile phone as illustrated. The device may communicate with the processor 72 and/or the memory, e.g. by wireless communication.

Figure 11:
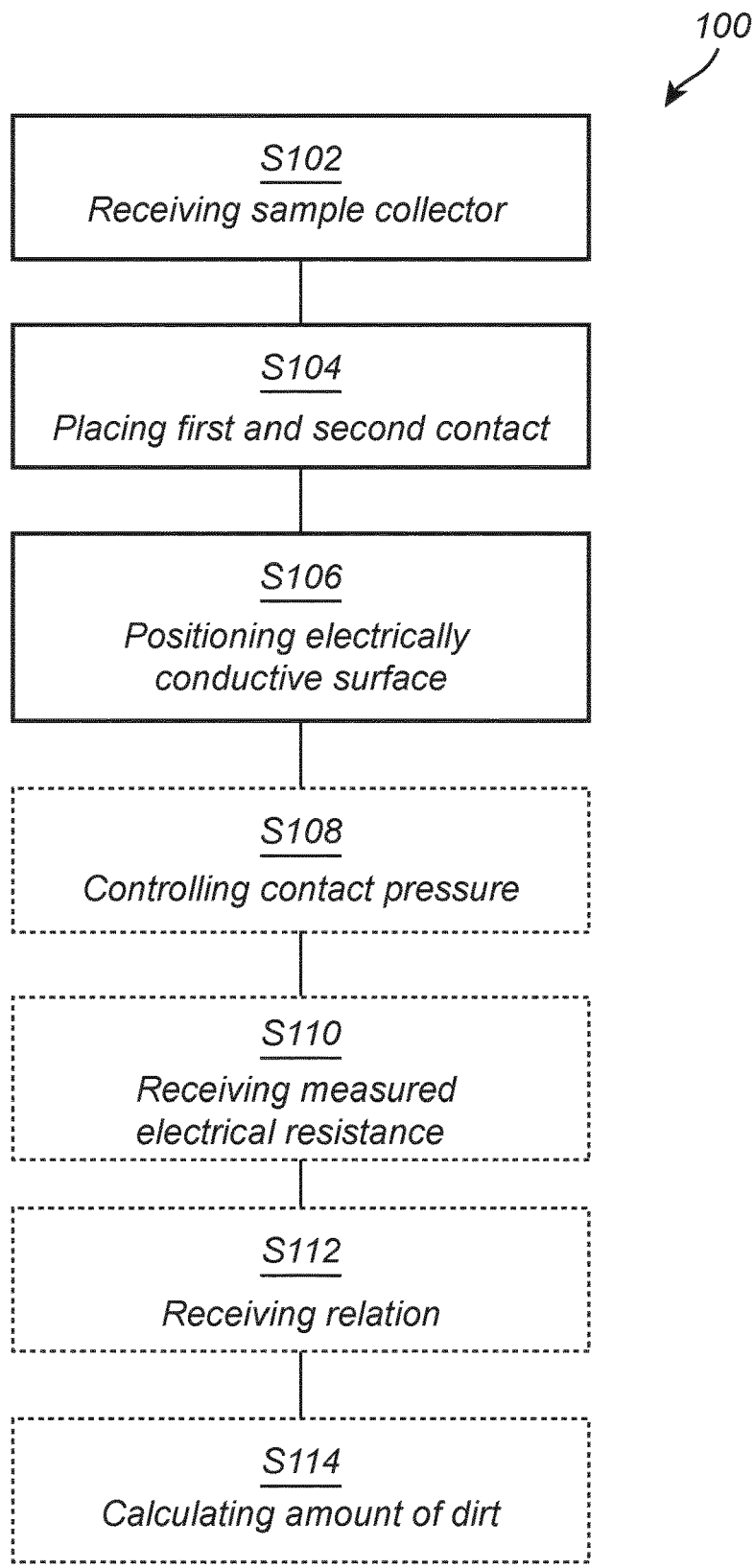
FIG. 11 is a flow chart of a method 100

FIG. 11 is a flow chart of a method 100 for measuring an amount of dirt 50. The method comprising steps S102, S104, S106 and optional steps S108, S110, S12, S114. The steps of the method 100 does not necessarily need to be performed in the following order. According to the method 100 a sample collector 40 is received S102. The sample collector 40 may e.g. be received S102 by a device 1 with the front surface 42 facing the first 11 and second 12 contact. According to the method 100 the first 11 and second 12 contact are placed S104 in contact with the front surface 42 of the received sample collector 40. This may e.g. be done by the sample collector 40 resting on the first 11 and second 12 contact or the sample collector 40 being pressed against the first 11 and second 12 contact. The electrically conductive surface 14 is positioned S106 e.g. by aligning it to the first 11 and second 12 contact. Aligning to the first contact 11 may e.g. be done by ensuring that the electrically conductive surface 14 rests or is pressed against the back surface 44 such that at one place where the first contact 11 is pressed against the sample collector 40 the electrically conductive surface 14 is simultaneously pressed against the sample collector 40 on the transverse side of the sample collector 40. Aligning to the second contact 12 may e.g. be done by ensuring that the electrically conductive surface 14 rests or is pressed against the back surface 44 such that at one place where the second contact 12 is pressed against the sample collector the electrically conductive surface 14 is simultaneously pressed against the sample collector 40 on the transverse side of the sample collector 40.

In addition to the above the method 100 may optionally comprise the following steps. The contact pressure may be controlled S108, e.g. by setting a distance between the electrically conductive surface 14 and the first 11 and/or second 12 contact. A measured electrical resistance may furthermore be received S110. A relation may furthermore be received S112, wherein the relation is a relation between measured electrical resistance and amount of dirt 50 situated on the front surface 42 of the sample collector 40 between the first 11 and second 12 contact. An amount of dirt 50 may be calculated S114, e.g. in a processor 72 by comparing the measured electrical resistance to the relation.

In the above the inventive concept has mainly been described with reference to a limited number of examples. However, as is readily appreciated by a person skilled in the art, other examples than the ones disclosed above are equally possible within the scope of the inventive concept, as defined by the appended claims.

The invention claimed is:

1. A device for measuring an amount of dirt, the device comprising:
    a receiver configured to receive a sample collector, the sample collector having a front surface and a back surface, wherein a dirt sample is attached to the front surface of the sample collector;
    a first contact configured to be placed in contact with the front surface of the received sample collector at a first contact point and a second contact configured to be placed in contact with the front surface of the received sample collector at a second contact point, the first and second contact being electrically conductive;
    an electrically conductive surface;

an aligner configured to position the electrically conductive surface in contact with the back surface of the received sample collector, wherein, when the electrically conductive surface is positioned by the aligner:
  a first part of the electrically conductive surface is placed in contact with the back surface of the sample collector at a point transverse to the first contact point on the front surface; and
  a second part of the electrically conductive surface is placed in contact with the back surface of the sample collector at a point transverse to the second contact point on the front surface; the device further comprising
a resistance meter configured to measure an electrical resistance between the first and the second contact,
wherein, when the first and second contact are placed in contact with the front surface and the electrically conductive surface is placed in contact with the back surface, the measured electrical resistance between the first and second contact represents the amount of dirt of the dirt sample, the represented amount of dirt being situated on the front surface of the sample collector between the first and second contact.

2. The device of claim 1, wherein the aligner comprises:
a front portion, the first and second contact being attached to the front portion;
a back portion, the electrically conductive surface being attached to the back portion;
a hinge which mechanically connects the front portion with the back portion, wherein the hinge allows rotational movement of the front portion in relation to the back portion, the hinge having
  a rotationally open position in which the receiver is free to receive the sample collector, and
  a rotationally closed position in which the electrically conductive surface is in contact with the back surface of the received sample collector;
wherein the front portion, the back portion and the hinge are configured to position the electrically conductive surface in contact with the back surface of the received sample collector when the hinge is in the rotationally closed position.

3. The device of claim 1, wherein the electrically conductive surface and the aligner are configured such that when the electrically conductive surface is positioned by the aligner an sample-collector/electrically-conductive-surface interface (SC/ECS interface) covers:
    a transverse representation of a sample-collector/first-contact interface (SC/1C interface); and
    a transverse representation of a sample-collector/second-contact interface (SC/2C interface);
  wherein:
  the SC/ECS interface represents an interface between the back surface of the received sample collector in contact with the electrically conductive surface;
  the SC/1C interface represents an interface between the front surface of the received sample collector in contact with the first contact, the transverse representation of the SC/1C interface being an area on the back surface defined by a transverse translation of the SC/1C interface from the front surface to the back surface;
  the SC/2C interface represents an interface between the front surface of the received sample collector in contact with the second contact, the transverse representation of the SC/2C interface being an area on the back surface defined by a transverse translation of the SC/2C interface from the front surface to the back surface.

4. The device of claim 3, wherein the electrically conductive surface and the aligner are configured such that when the electrically conductive surface is positioned by the aligner the sample-collector/electrically-conductive-surface interface (SC/ECS interface) additionally covers:
  a transverse representation of a sample measurement area;
  wherein the sample measurement area is an area on the front surface of the sample collector which extends between the first and the second contact, the transverse representation of the sample measurement area being an area on the back surface defined by a transverse translation of the sample measurement area from the front surface to the back surface.

5. The device of claim 1, wherein the device further comprises
a contact pressure controller configured to set a pressure exerted on the sample collector by the electrically conductive surface and at least one of the first and the second contact when the first and second contact are placed in contact with the front surface and the electrically conductive surface is placed in contact with the back surface.

6. A system for measuring an amount of dirt, the system comprising:
  the device of claim 1;
  a memory configured to store a relation between measured electrical resistance and amount of dirt situated on the front surface of the sample collector between the first and second contact; and
  a processor configured to:
    receive the measured electrical resistance from the resistance meter,
    receive the relation from the memory, and to
    calculate the amount of dirt using the measured electrical resistance and the relation.

7. A method for measuring an amount of dirt, the method comprising:
  receiving a sample collector, the sample collector having a front surface and a back surface, wherein a dirt sample is attached to the front surface of the sample collector;
  placing a first contact in contact with the front surface of the received sample collector at a first contact point and placing a second contact in contact with the front surface of the received sample collector at a second contact point;
  positioning an electrically conductive surface in contact with the back surface of the received sample collector, wherein, when the electrically conductive surface is positioned:
    a first part of the electrically conductive surface is placed in contact with the back surface of the sample collector at a point transverse to the first contact point on the front surface; and
    a second part of the electrically conductive surface is placed in contact with the back surface of the sample collector at a point transverse to the second contact point on the front surface; the method further comprising
  measuring an electrical resistance between the first and the second contact,
  wherein, when the first and second contact are placed in contact with the front surface and the electrically conductive surface is positioned in contact with the back surface, the measured electrical resistance between the first and second contact represents the amount of dirt of the dirt sample, the represented amount of dirt being situated on the front surface of the sample collector between the first and second contact.

8. The method of claim 7, wherein the electrically conductive surface is positioned such that an sample-collector/electrically-conductive-surface interface (SC/ECS interface) covers:
- a transverse representation of a sample-collector/first-contact interface (SC/1C interface); and
- a transverse representation of a sample-collector/second-contact interface (SC/2C interface);

wherein:
the SC/ECS interface represents an interface between the back surface of the received sample collector in contact with the electrically conductive surface;
the SC/1C interface represents an interface between the front surface of the received sample collector in contact with the first contact, the transverse representation of the SC/1C interface being an area on the back surface defined by a transverse translation of the SC/1C interface from the front surface to the back surface;
the SC/2C interface represents an interface between the front surface of the received sample collector in contact with the second contact, the transverse representation of the SC/2C interface being an area on the back surface defined by a transverse translation of the SC/2C interface from the front surface to the back surface.

9. The method of claim 8, wherein the electrically conductive surface is positioned such that the sample-collector/electrically-conductive-surface interface (SC/ECS interface) additionally covers:
a transverse representation of a sample measurement area;
wherein the sample measurement area is an area on the front surface of the sample collector which extends between the first and the second contact, the transverse representation of the sample measurement area being an area on the back surface defined by a transverse translation of the sample measurement area from the front surface to the back surface.

10. The method of claim 7, wherein the method further comprises
controlling a contact pressure to set a pressure exerted on the sample collector by the electrically conductive surface and at least one of the first and the second contact when the first and second contact are placed in contact with the front surface and the electrically conductive surface is placed in contact with the back surface.

11. The method of claim 7, wherein the method further comprises:
receiving a measured electrical resistance from the resistance meter;
receiving a relation between measured electrical resistance and amount of dirt situated on the front surface of the sample collector between the first and second contact;
calculating the amount of dirt using the measured electrical resistance and the relation.

12. A kit of parts comprising:
a sample collector comprising a front surface and a back surface, the sample collector being configured to collect a dirt sample from an object when the object is wiped with the front surface of the sample collector, the sample collector having one or more electrical resistance properties; and
the system of claim 6,
wherein the relation stored in the memory of the system, that is a relation between measured electrical resistance and amount of dirt situated on the front surface of the sample collector between the first and second contact, includes at least one electrical resistance property of the sample collector.

13. The kit of parts of claim 12, wherein the sample collector is a microfiber cloth.

14. The kit of parts of claim 13, wherein the microfiber cloth weight per square meter is below a threshold, the threshold being 600 grams per square meter.

15. The kit of parts of claim 13, the kit of parts further comprising a block, wherein the block is configured to receive the microfiber cloth on a flat surface such that when the flat surface of the block is wiped over a flat surface of the object the microfiber cloth is pressed between the flat surface of the block and the flat surface of the object.

* * * * *